Aug. 7, 1945.
H. C. TRICH
2,381,528
VALVE FOR HYDRAULIC CONTROL SYSTEMS
Filed Nov. 27, 1942
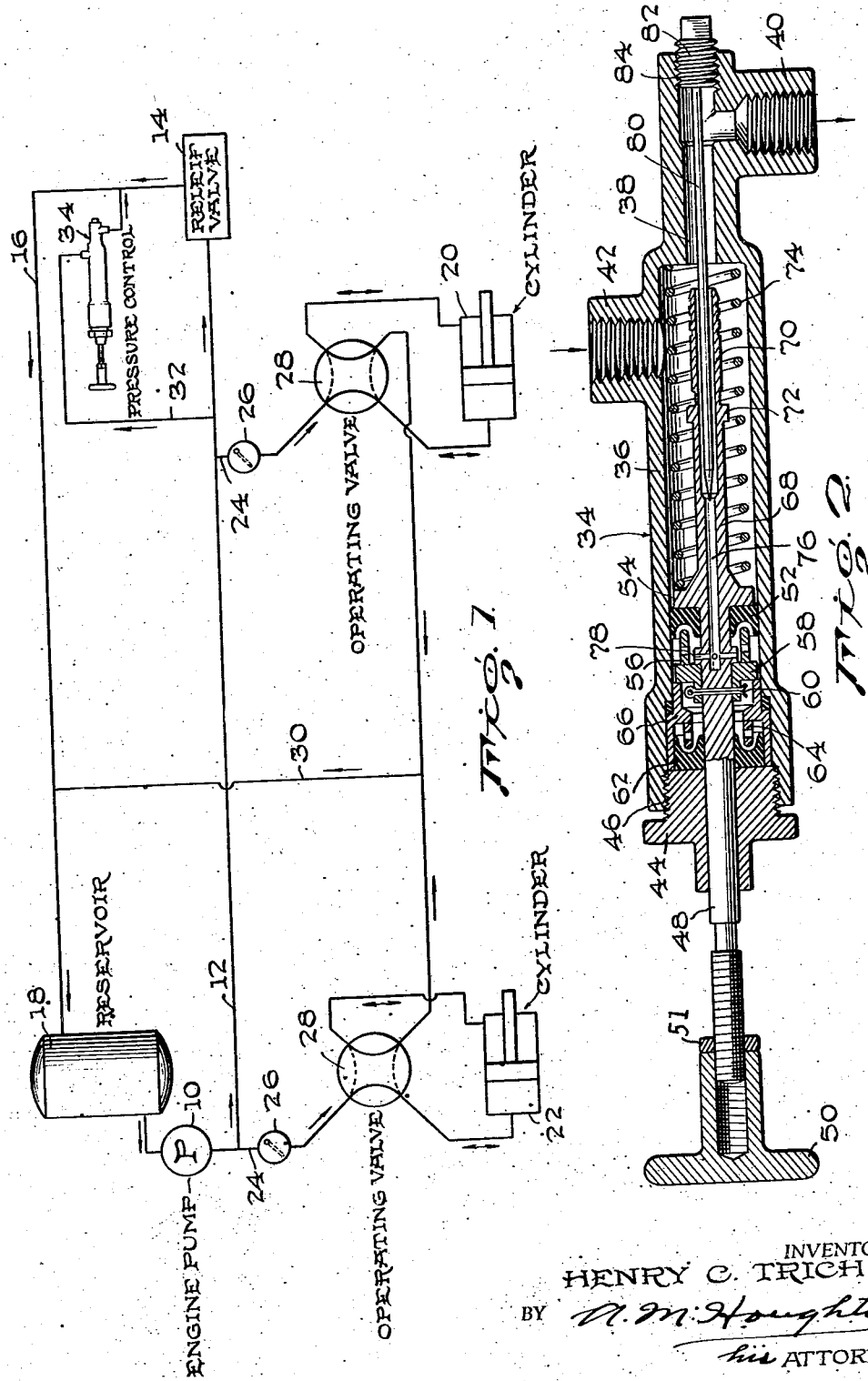
INVENTOR:
HENRY C. TRICH
BY *N. M. Houghton*
*his* ATTORNEY Patented Aug. 7, 1945

2,381,528

UNITED STATES PATENT OFFICE 2,381,528

VALVE FOR HYDRAULIC CONTROL SYSTEMS

Henry C. Trich, Santa Monica, Calif., assignor to Hoof Products Company, Chicago, Ill., a corporation of Illinois Application November 27, 1942, Serial No. 467,139

14 Claims. (Cl. 251—138)

The present invention relates to valve for hydraulic control systems and more particularly is concerned with systems for selectively setting up a source of actuating pressure for the purpose of operating and controlling mechanical instrumentalities.

In hydraulic control systems of the type best exemplified by that employed on aircraft, a pressure creating instrumentality, such for example as an engine driven pump, may operate continuously to supply energy in the form of fluid pressure. In accordance with conventional practice, the fluid is continuously circulated through a relief valve, thus maintaining a supply line under elevated, predetermined pressure conditions. Suitable control valves are employed to supply the pressure fluid to the various operating instrumentalities as desired. The continuous passage of hydraulic fluid through the pump and relief valve and the resulting continuous liberation of heat renders this system impractical for smaller installations where heating may be excessive.

Since utilization of the hydraulically controlled instrumentalities may occur only infrequently, it has been proposed to normally by-pass the relief valve to release all substantial pressure in the system, and to close the by-pass at times when operating pressure is necessary. Such controls, however, must necessarily be somewhat automatic in character in order to obviate the necessity for specific attention. The total available pressure capable of being maintained between the pump and relief valve necessarily is substantially in excess of that required to operate the mechanical instrumentalities. Accordingly, therefore, it has been further proposed to provide a valve in the by-pass line which will remain closed during action of the mechanical instrumentalities but which will automatically open at times when the mechanical movement is completed and the system resumes its normal elevated pressure. Such systems, however, are susceptible to gust loads which momentarily will disengage the valve before the work is completed. It may therefore be necessary to re-engage the valve or hold it in engaged position until the hydraulic operation is completed; thus distracting the operator's attention from other duties. Efforts have been made to provide a by-pass valve giving a predetermined time lag but in general the operation of such devices is unreliable due to the effect of small particles of foreign matter upon the necessary control apertures.

It is an important object of the present invention to obviate the foregoing difficulties by providing an engine driven pump system having a low pressure by-pass or return line about the relief valve of the pressure system adapted normally to release the pressure but being provided with means operable at all times to close off or restrict the by-pass or return line and maintain a predetermined restriction over a predetermined time period, ample for operation of the desired instrumentalities.

Another object of the present invention contemplates the provision of a return line pressure control valve as above which normally permits free passage of fluid but is operable upon simple manipulation to restrict fluid flow until the mechanical operation is completed.

Among other objects of the invention is the provision of a time lag pressure control valve, as above, which is free from the influence of gust loads and adapted to function positively over long periods of service, substantially unaffected by the small quantities of foreign matter existing within the ordinary hydraulic system; the provision of a valve, as above, which compensates in some measure for temperature conditions and variation in operational pressures, as well as the provision of a valve construction which is self-cleaning in operation and thus free from the necessity for frequent repair or servicing.

Other objects will be apparent from the following specification and drawing, wherein Fig. 1 represents more or less diagrammatically a hydraulic system embodying the principles of the present invention, and Fig. 2 is a sectional view taken centrally and longitudinally through the pressure control valve shown in Fig. 1.

The system shown in Fig. 1 embodies a constantly driven engine pump 10 capable of supplying fluid under pressure to the conduit 12 from whence it may pass through a relief valve 14 to a return line 16 and a pump inlet reservoir 18. The relief valve 14 is set to maintain a predetermined operative pressure in the line 12. For the purpose of supplying hydraulic fluid to various operating instrumentalities 20 and 22 through conduits 24, the conduits 24 are provided with check valves 26 and operating control valves 28 through the agency of which the mechanical instrumentalities may be actuated at will. As clearly appears from the drawing, the control valves are of the type which provide for returning hydraulic fluid to the reservoir through return line 30.

The instrumentalities 20 and 22 may, for example, represent the so-called operating struts of an aircraft landing gear.

In order to prevent the generation of excessive heat at times when the instrumentalities 20 and 22 are not in operation a by-pass conduit 32 is provided with a control instrumentality 34, shown more in detail in Fig. 2. This pressure control valve 34 includes a generally cylindrical body portion 36 provided with an axially extending central chamber terminating at its right-hand extremity in an outlet passageway 38 communicating with an outlet fitting 40. An inlet fitting 42 is disposed closely adjacent the passageway 38 so that the inlets and outlet are normally in communication. The left-hand-most extremity of the cylindrical body 34 is provided with a cap 44 threadedly engaged therewith as at 46.

The cap or fitting provides a bearing guideway for an axially movable rod or plunger 48 having a manually engageable operating knob 50 axially adjustable thereon, as shown. Internally of the cylindrical body member the rod is provided with a piston or dash-pot structure comprising a flexible cup retainer 52 resting against an enlarged or flanged portion 54 of the plunger shaft. The so-called flexible sealing cup is maintained in the position shown by a cup retainer 56 and a collar 58 fixed upon the plunger shaft by means of a pin 60. From the foregoing it is apparent that as the plunger is shifted to the right the collar 58 and sealing cap are carried with it, the configuration of the flexible cup, as shown, being such as to permit hydraulic fluid within the chamber to pass by the cup and into the space therebehind.

Egress of hydraulic fluid along the plunger shaft 48 is prevented by an additional flexible sealing cup 62 maintained in the position shown by a cup retainer 64 and a fixed collar 66.

The plunger extending axially beyond the flange 54, as at 68, terminates in a piston-like extremity 70 adapted to slide axially and snugly into the cylindrical passageway 38 and thus substantially seal the outlet. A suitable shoulder 72 is provided to limit the movement of the valve piston 70 into the passageway 38.

In accordance with the present invention, means is provided for facilitating automatic return of the parts subsequent to shifting to the last-named position. To this end helical coil spring 74 bears against the right-hand-most extremity of the valve chamber and against the flange 54. Fluid trapped behind the sealing cup 52 is relieved through a radial passageway 78 communicating with an axial passageway 76, extending to the right-hand-most extremity of the plunger shaft. It is important to note that in accordance with the present invention the rate of fluid flow through the passageway 76 is determined by means of a metering pin or needle 80, rigidly supported upon the housing through the agency of a threaded plug 82. In other words the needle or pin 80 is rigid with the member 82, which in turn is threadedly and adjustably engaged with the housing or body 36, as at 84. It is important to note that the needle or pin 80 is receivable within the passageway 76 when the relatively shiftable parts are moved to the right. While the relative dimensions of the parts are such as to necessitate a more or less diagrammatic showing, it is to be understood that the clearance between the needle and the passage in which it is received is such as to permit a predetermined fluid flow for any condition of interengagement, the rate of which flow is controlled by the metering pin or needle 80 in the passageway 76 toward and from which the piston-like extremity 70 of the plunger moves.

From the foregoing it will be apparent that in operation the pressure control valve 34 maintains the operative position represented in Fig. 2. At the time it is desired to actuate one or more of the mechanical instrumentalities 22 and 24 the appropriate operating valve 28 is adjusted and the plunger 48 forced inwardly against the action of spring 74 until the piston-like extension 70 is accommodated within the cylindrical outlet passageway 38. The distance of axial interengagement may be predetermined in accordance with the setting of the axially adjustable control handle 50, the locknut 51 of which affords a limiting stop upon impingement with the cap 44. Obviously this adjustment also predetermines the degree of axial interengagement between the needle 80 and the passage 76. As the shiftable parts are moved to the valve closing position, hydraulic fluid passes peripherally about the sealing cup 52 and into the chamber therebehind. The build-up in pressure at line 12, initiated by closure of the passageway 38, together with the action of the helical spring 74, immediately tends to urge the parts toward their original position in Fig. 2. This tendency is, however, resisted by the incompressibility of the fluid trapped behind the movable parts and releasable through-passages 78 and 76 and through the fitting 40. In short, the rate at which the parts tend to return to normal is predetermined by the adjusted dimensions of the annular fluid passageway between the needle or pin 80 and the passage 76 within which it is received. Accordingly, therefore, the parts occupy a time period of return to their initial position, dependent upon the width of the passages and the distance to which the needle is inserted. After a time lag interval, predetermined by making the adjustment of the parts as above, the parts resume the position shown and free communication between inlet 42 and outlet 40 is effected.

From the foregoing it will be apparent that upon initial actuation of the control handle 50 the power line 12 immediately assumes an elevated pressure determined by the setting of relief valve 14. This pressure is maintained over a predetermined length of time, sufficient to complete operation of the instrumentalities 20 or 22, and is subsequently automatically released without attention by the operator.

The present invention, as illustrated in the specific embodiment, according provides a simple and effective means for setting up desired operating pressures in a continuously operating engine type of system and for automatically releasing the pressure after the desired time interval of operation. It is evident that the present construction is adapted to operate faithfully, with freedom from variation. Thus it is evident that the fluid passageways providing the necessary restriction for predetermined operation are so disposed as to be in effect self-cleaning. Deposits of foreign matter which might otherwise occur are necessarily dislodged and the parts tend to maintain their originally designed clearance with an accompanying reliability of operation.

It is obvious that various modifications will occur to those skilled in the art in view of the foregoing description without departing from the nature or spirit thereof and the invention is accordingly not limited to the illustrated description therein except as set forth in the appended claims.

What I claim is:

1. A time lag pressure control valve comprising a valve chamber having an inlet and an outlet normally and directly in communication through said chamber, an outlet control valve in said chamber having a passage therethrough to deliver fluid under pressure to the outlet, flow regulating means receivable in the passage, means for moving said valve relative to said flow regulating means to close the outlet and permitting a predetermined rate of flow through the passage, means for moving said valve to open the outlet, and a pressure controlled dash-pot operatively associated with said valve and releasable upon flow of fluid under pressure through the valve passage to the outlet to retard return movement of said valve from its outlet closing position.

2. A time lag pressure control valve comprising a valve chamber having an inlet and an outlet normally and directly in communication through said chamber, an outlet control valve in said chamber having a passage therethrough to deliver fluid under pressure to the outlet, fixed flow regulating means receivable in the passage, means for moving said valve relative to said flow regulating means to close the outlet and permitting a predetermined rate of flow through the passage, means for moving said valve to open the outlet, and a pressure controlled dash-pot operatively associated with said valve and releasable upon flow of fluid under pressure through the valve passage to the outlet to retard return movement of said valve from its outlet closing position.

3. A time lag pressure control valve comprising a valve chamber having an inlet and an outlet normally and directly in communication through said chamber, an outlet control valve in said chamber having a passage therethrough to deliver fluid under pressure to the outlet, fixed adjustable flow regulating means receivable in the passage, means for moving said valve relative to said flow regulating means to close the outlet and permitting a predetermined rate of flow through the passage, means for moving said valve to open the outlet, and a pressure controlled dash-pot operatively associated with said valve and releasable upon flow of fluid under pressure through the valve passage to the outlet to retard return movement of said valve from its outlet closing position.

4. A time lag pressure control valve comprising a valve chamber having an inlet and an outlet normally and directly in communication through said chamber, an outlet control valve in said chamber having a passage therethrough to deliver fluid under pressure to the outlet, fixed adjustable flow regulating means receivable in the passage, manual means for moving said valve relative to said flow regulating means to close the outlet and permitting a predetermined rate of flow through the passage, means for moving said valve to open the outlet, and a pressure controlled dash-pot operatively associated with said valve and releasable upon flow of fluid under pressure through the valve passage to the outlet to retard return movement of said valve from its outlet closing position.

5. A time lag pressure control valve comprising a valve chamber having an inlet and an outlet normally and directly in communication through said chamber, an outlet control valve in said chamber having a passage therethrough to deliver fluid under pressure to the outlet, fixed adjustable flow regulating means receivable in the passage, adjustable manual means for moving said valve relative to said flow regulating means to close the outlet and permitting a predetermined rate of flow through the passage, means for moving said valve to open the outlet, and a pressure controlled dash-pot operatively associated with said valve and releasable upon flow of fluid under pressure through the valve passage to the outlet to retard return movement of said valve from its outlet closing position.

6. A time lag pressure control valve comprising a valve chamber having an inlet and an outlet normally and directly in communication through said chamber, an outlet control valve in said chamber having a passage therethrough to deliver fluid under pressure to the outlet, fluid adjustable flow regulating means receivable in the passage, adjustable manual means for moving said valve relative to said flow regulating means to close the outlet and permitting a predetermined rate of flow through the passage, automatic means for moving said valve to open the outlet, and a pressure controlled dash-pot operatively associated with said valve and releasable upon flow of fluid under pressure through the valve passage to the outlet to retard return movement of said valve from its outlet closing position.

7. A time lag pressure control valve comprising a valve chamber having an inlet and an outlet normally and directly in communication through said chamber, an outlet control valve in said chamber having a passage therethrough to deliver fluid under pressure to the outlet, fluid adjustable flow regulating means receivable in the passage, adjustable manual means for moving said valve relative to said flow regulating means to close the outlet and permitting a predetermined rate of flow through the passage, spring means for moving said valve to open the outlet, and a pressure controlled dash-pot operatively associated with said valve and releasable upon flow of fluid under pressure through the valve passage to the outlet to retard return movement of said valve from its outlet closing position.

8. A time lag pressure control valve comprising a valve chamber having an inlet and an outlet normally and directly in communication through said chamber, a valve having outlet closing means and a dash-pot piston and provided with a passage connecting the outlet and a dash-pot chamber, fixed flow regulating means receivable in the passage, means for moving said valve relative to said flow regulating means to close the outlet and permitting a predetermined rate of flow through the passage, and a spring for moving said valve against retarding dash-pot pressure to open the outlet upon flow of fluid under pressure from the dash-pot chamber through the valve to the outlet.

9. A time lag pressure control valve comprising a valve chamber having an inlet and an outlet normally and directly in communication through said chamber, a valve having outlet closing means and a dash-pot piston and provided with a passage connecting the outlet and a dash-pot chamber, fixed flow regulating means receivable in the passage, adjustable manual means for moving said valve relative to said flow regulating means to close the outlet and permitting a predetermined rate of flow through the passage, and a spring for moving said valve against retarding dash-pot pressure to open the outlet upon flow of fluid under pressure from the dash-pot chamber through the valve to the outlet.

10. A time lag pressure control valve comprising a valve chamber having an inlet and an outlet normally and directly in communication through said chamber, a valve having outlet closing means and a dash-pot piston and provided with a passage connecting the outlet and a dash-pot chamber, fixed flow regulating means receivable in the passage, a valve operating plunger having an adjustable handle for manually actuating said valve relative to said flow-regulating means to close the outlet and permitting predetermined rate of flow through the passage, and a spring to move said valve against retarding dash-pot pressure to open the outlet upon flow of fluid under pressure from the dash-pot chamber through the valve passage to the outlet.

11. A time lag pressure control valve comprising a valve chamber having an inlet and an outlet normally and directly in communication through said chamber, a valve having outlet closing means and a dash-pot piston and provided with a passage connecting the outlet and a dash-pot chamber, a fixed metering pin mounted in the valve chamber and receivable in the valve passage, a valve operating plunger for manually actuating the said valve relative to said pin and permitting a predetermined rate of flow through the passage, and a spring to move said valve against retarding dash-pot pressure to open the outlet upon flow of fluid under pressure from the dash-pot chamber through the valve passage to the outlet.

12. A time lag pressure control valve comprising a valve chamber having an inlet and an outlet normally and directly in communication through said chamber, a valve having outlet closing means and a dash-pot piston and provided with a passage connecting the outlet and a dash-pot chamber, a fixed metering pin adjustably mounted in the valve chamber and receivable in the valve passage, a valve operating plunger for manually actuating the said valve relative to said pin and permitting a predetermined rate of flow through the passage, and a spring to move said valve against retarding dash-pot pressure to open the outlet upon flow of fluid under pressure from the dash-pot chamber through the valve passage to the outlet.

13. A time lag pressure control valve comprising a valve chamber having an inlet and an outlet normally and directly in communication through said chamber, a valve having outlet closing means and a dash-pot piston and provided with a passage connecting the outlet and a dash-pot chamber, a fixed metering pin adjustably mounted in the valve chamber and receivable in the valve passage, a valve operating plunger for manually actuating the said valve relative to said pin and permitting a predetermined rate of flow through the passage, a stop for said plunger, and a spring to move said valve against retarding dash-pot pressure to open the outlet upon flow of fluid under pressure from the dash-pot chamber through the valve passage.

14. A time lag pressure control valve comprising a valve chamber having an inlet and an outlet normally and directly in communication through said chamber, a valve having outlet closing means and a dash-pot piston and provided with a passage connecting the outlet and a dash-pot chamber, a fixed metering pin adjustably mounted in the valve chamber and receivable in the valve passage, a valve operating plunger for manually actuating the said valve relative to said pin and permitting a predetermined rate of flow through the passage, adjustable stop means for said plunger, and a spring to move said valve against retarding dash-pot pressure to open the outlet upon flow of fluid under pressure from the dash-pot chamber through the valve passage.

HENRY C. TRICH.